G. W. HOWARD.
Car-Axles.
No. 150,574.
Patented May 5, 1874.
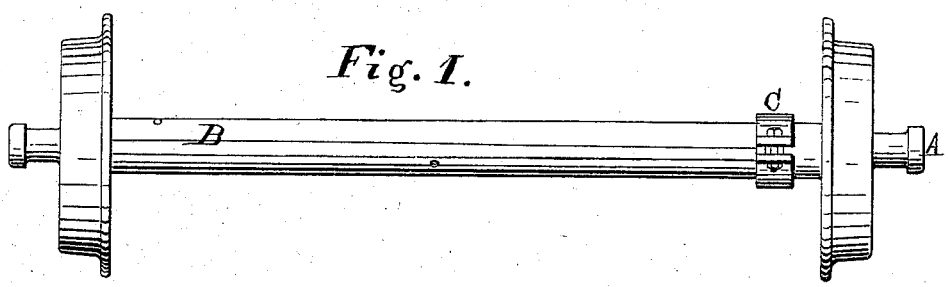
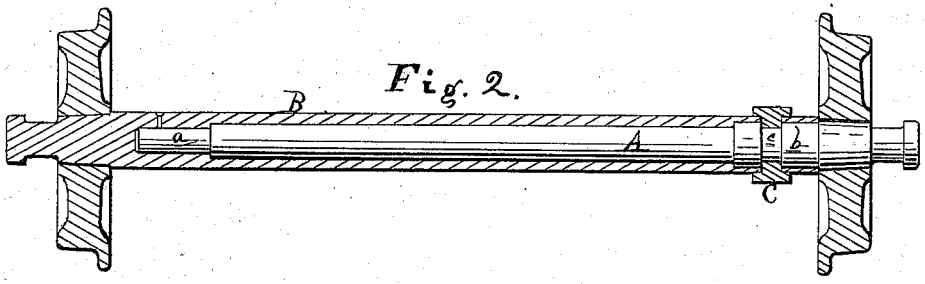
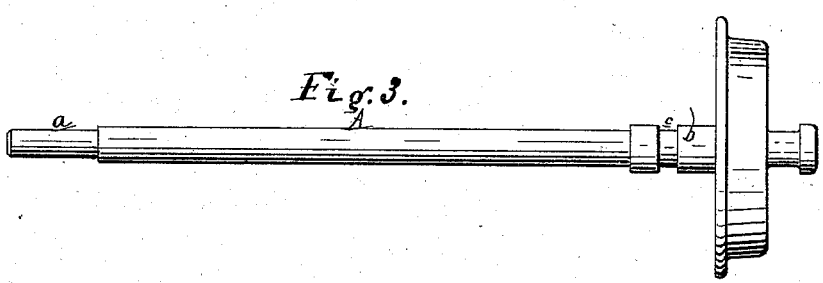
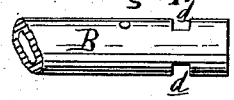

UNITED STATES PATENT OFFICE.

GEORGE W. HOWARD, OF PONTIAC, MICHIGAN.

IMPROVEMENT IN CAR-AXLES.

Specification forming part of Letters Patent No. 150,574, dated May 5, 1874; application filed January 31, 1874.

*To all whom it may concern:*

Be it known that I, GEORGE W. HOWARD, of Pontiac, in the county of Oakland and State of Michigan, have invented an Improvement in Railway-Car Axles, of which the following is a specification:

This invention has for its object to so construct a railway-car axle as to enable the wheels to revolve independently of each other without being loose upon the axle; and it consists in securing one wheel to a tubular axle, which is sleeved upon another axle, to which the other wheel is secured, and in a clamp-collar for preventing one axle from sliding longitudinally upon the other.

Figure 1 is an elevation of the axle and wheels. Fig. 2 is a longitudinal section. Fig. 3 is an elevation of the inner axle. Fig. 4 is an elevation of the inner end of the tubular axle, showing the slots. Fig. 5 is a side elevation of the clamp-collars.

In the drawing, A represents a solid axle, to which one wheel is secured, its inner end having a journal, $a$, turned on it, which enters a bearing in the tubular axle B, which is sleeved on the axle A, the other car-wheel being secured to the outer end of said tubular axle. At $b$ there is a bearing on the axle A for the inner end of the axle B, and in this bearing is turned an annular groove, $c$, two slots, $d\ d$, coincident with this groove, being cut in the axle B. C is a two-part clamp-collar, secured on the axle B by the bolts $e\ e$ passing through the flanges of said collar. On the inner face of each collar-clamp is a segment, $f$, which projects through the slot $d$ into the groove $c$, and thus keeps the two axles from sliding upon each other. The sleeve B is perforated with oil-holes, through which to lubricate the bearings.

In going around a curve, the wheel on axle B may have to travel faster than the other, being on the outer leg, in which case the axle B revolves upon the others. On straight track, the axles move as one, as would the ordinary single axle.

The wheels are pressed onto their respective journals in the usual manner. The segments $f$ should snugly fit the slots $d$, and the removal of the clamps readily allows the two parts of the axle to be disconnected. The shoulders of the journal $a$ and bearing $b$, with their coincident shoulders in the tubular axle, together with the end of the journal $a$ resting against the end of its proper bearing in the tubular axle, and the inner end of said tubular axle resting against the inner face of wheel on the solid axle, all form bearings to prevent the two axles from sliding together, while the clamps are designed to prevent them from drawing apart.

I do not claim, broadly, the invention of a combined solid and tubular axle, the wheels attached thereto revolving independently; nor do I claim the employment of a slot upon a solid axle; but

What I claim as my invention, and desire to secure by Letters Patent, is—

1. A compound railway-axle, wherein are combined the solid axle A, provided with journal $a$, bearing $b$, and grooved channel $c$, and the tubular axle B, provided with slots $d$, substantially as and for the purposes set forth.

2. In combination with a solid axle, A, and tubular axle B, the former being inclosed within the latter, and provided with channel $c$, and the latter provided with slot $d$, the collar-clamp C, provided with segments $f$, substantially as and for the purposes described.

G. W. HOWARD.

Witnesses:
  CHAS. E. HUESTIS,
  H. S. SPRAGUE.